UNITED STATES PATENT OFFICE.

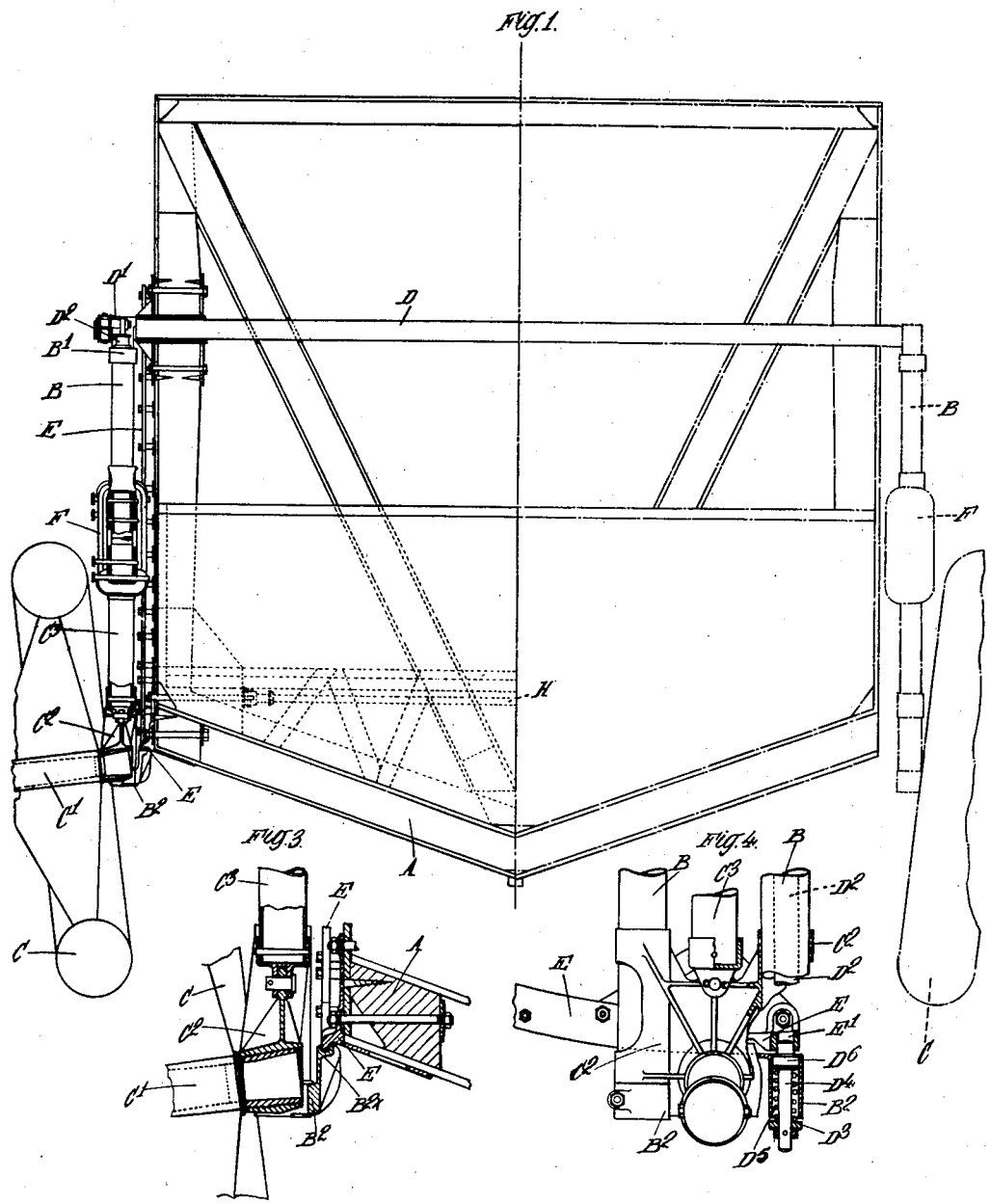

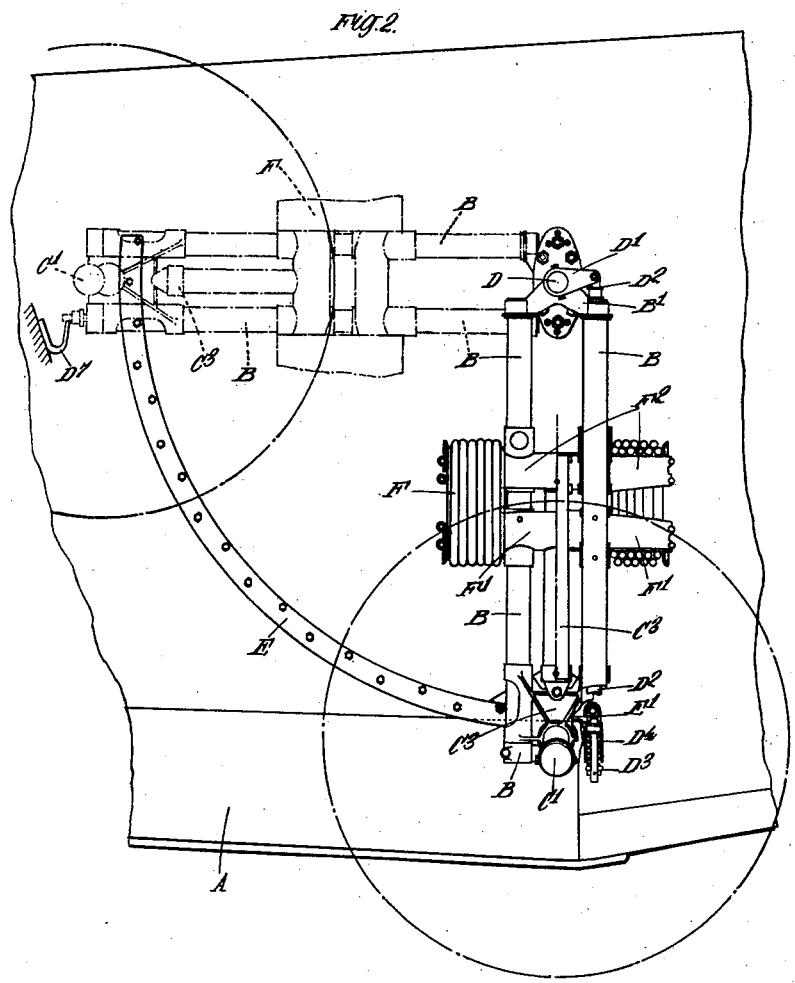

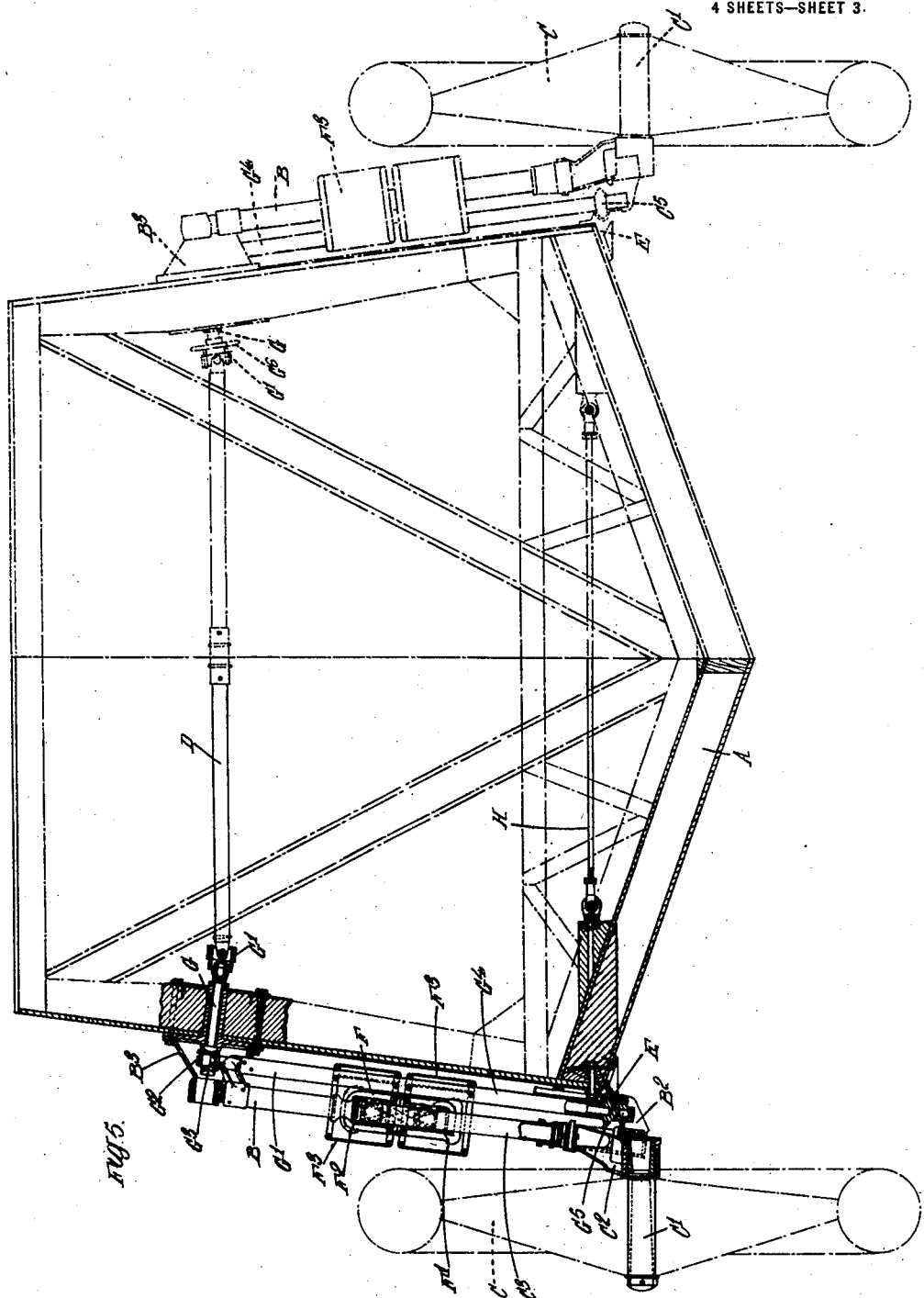

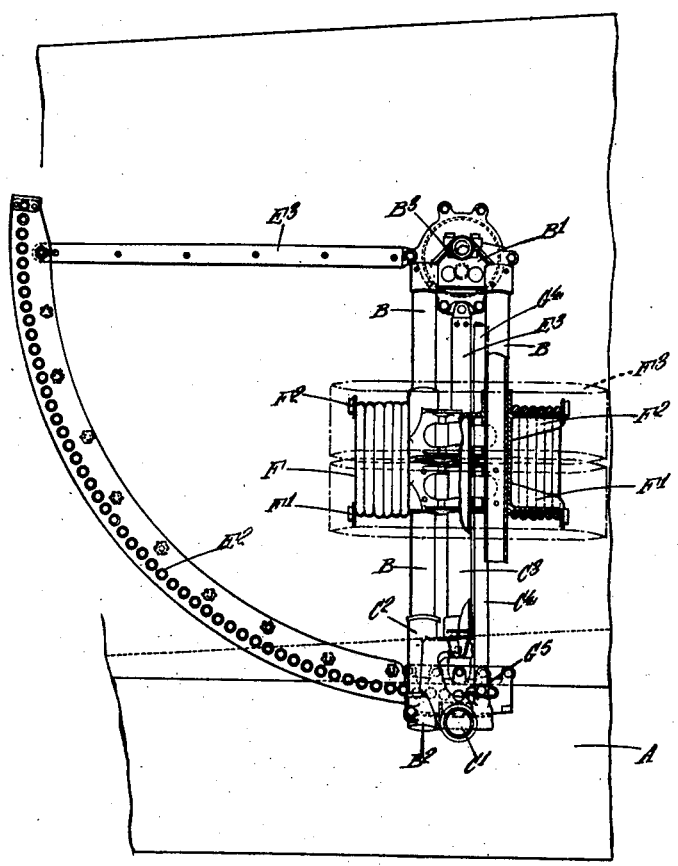

REGINALD KIRSHAW PIERSON AND THOMAS SMITH DUNCAN, OF WESTMINSTER, LONDON, ENGLAND, ASSIGNORS TO VICKERS LIMITED, OF WESTMINSTER, LONDON, ENGLAND.

ALIGHTING OR LANDING GEAR FOR AIRCRAFT.

1,364,518.  Specification of Letters Patent.  Patented Jan. 4, 1921.

Application filed July 31, 1920. Serial No. 400,507.

*To all whom it may concern:*

Be it known that we, REGINALD KIRSHAW PIERSON and THOMAS SMITH DUNCAN, both subjects of the King of Great Britain, residing at Vickers House, Broadway, Westminster, in the county of London, England, have invented certain new and useful Improvements in or Relating to Alighting or Landing Gear for Aircraft, of which the following is a specification.

This invention relates to aircraft and has particular reference to seaplanes or hydroaeroplanes of the flying boat type.

According to this invention we provide the machine with means whereby the pilot or other occupant can render the said machine capable of alighting on water or on land or the deck of a ship or other landing stage as may be desired. For this purpose the machine is provided with landing gear comprising wheels such as ordinarily employed on aeroplanes and these wheels are adapted to occupy an inoperative position when the machine is required to alight on the water or to occupy an operative position when the machine is required to land on the ground or other landing stage. The landing gear may comprise two units or frames one on each side of the hull or fuselage of the aircraft, these units or frames which carry the wheels being independent but adapted to be angularly moved simultaneously by means of a transverse operating shaft extending through or mounted within the hull or fuselage. The outer or lower end of each frame is adapted to engage with a quadrant and to slide upon the same to permit of angular movement of the frame through an angle of about 90°. The wheel axle of each frame is mounted on a member which is movable relatively to the frame and is adapted to coöperate with any suitable form of shock absorber. The movement of the landing wheels from one position to another may be effected in any appropriate manner by means operated from the pilot's or mechanic's seat and locking means preferably automatic are provided for retaining the landing wheels in either of the two positions. The locking means may be so constructed and arranged that they are automatically unlocked by the movement which is necessary to change the angular position of the landing wheels. The frames carrying the landing wheels may be mounted on the ends of the transverse operating shaft and adapted to be connected thereto by suitable means so that partial rotation of the shaft will effect the angular movement of the frames; the said means may also comprise locking devices which retain the frames in the operative or inoperative positions; or the said frames may be mounted on suitable pivots secured to the sides of the hull and the transverse shaft may be adapted to operate gearing which effects the angular movement of the said frames. This gearing may be of such a character as to lock the frames in the operative or inoperative positions.

In order that the said invention may be clearly understood and readily carried into effect, the same will now be described more fully with reference to the accompanying drawings, in which:—

Figure 1 is a transverse sectional view through the hull or fuselage of a flying boat showing one construction of the improved landing gear partly in section at one side and in dot and pick lines at the other side.

Fig. 2 is a side view showing the landing gear in full lines in the operative or landing position and in dotted lines in the inoperative position.

Figs. 3 and 4 are enlarged detail views.

Figs. 5 and 6 are respectively a transverse sectional view and a side view of a modified construction of the landing gear.

A represents the hull of the flying boat. B, B represent the frames at the sides of the hull carrying the landing wheels C, and D represents the transverse shaft extending through the hull A which shaft as shown in Figs. 1 and 2 carries at its ends, the upper ends of the frames B whose lower ends are adapted to coöperate with quadrants E secured to the hull sides which in this example are parallel. Each frame B comprises two parallel tubes whose upper ends are united by a bridge piece B' which is angularly movable with the frame tubes B on the end of the transverse shaft, the lower ends of the frame tubes being united by a bridge piece or the like B² which as shown at B²ˣ in Fig. 3 is shaped to fit on or engage with the quadrant E to prevent lateral or sidewise movement of the frames carrying the landing wheels. The axle C' of each landing wheel is supported in a carrier C² slidably mounted on the two frame tubes B of each frame and formed or provided with an upward extension C³ adapted to slide in a guide forming part of a cross member F' which is rigidly fixed to the two frame tubes B. The upper end of the extension C³ carries a cross member F² similar to the cross member F but slidable on the two frame tubes B; around the ends of the two cross members F', F² elastic strands F are wound so that when the carrier is moved upwardly relatively to the tube due to a landing shock its movement is resisted and the shock absorbed by the elastic strands; any suitable form of shock absorber such as oleo-pneumatic devices or metal springs with or without dashpots or brakes may be used. At each end of the transverse shaft D, a lever or arm D' is keyed or secured and the end of each lever is pivotally connected to the upper end of a rod D² extending through one of the frame tubes B. The lower end of the rod D² is formed with a projection D³ which is free to slide along the stem of a locking bolt D⁴ housed in a part of the bridge piece B² connecting the lower ends of the frame tubes B. The locking bolt D⁴ is adapted to engage with a notch E' in the lower end of the quadrant E and is normally retained in engagement with the notch E' by a spring D⁵ disposed around the stem of the bolt between a shoulder D⁶ thereon and the projection D³ on the rod D².

In order to raise the landing wheels from the position shown in full lines in Fig. 2 to that shown in dotted lines in Fig. 2, the transverse shaft D is partially rotated by suitable means actuated by the pilot, so that the arms D' secured to the shaft D angularly move and depress or longitudinally move the rods D² so that the bolts D⁴ are moved by the projections D³ on the rods D² against the action of the spring D⁵ out of engagement with the notches E' in the quadrants E thereby leaving the frames carrying the landing wheels free to be angularly moved. The angular movement to raise the frames is caused by the continued angular movement of the shaft D which causes the arms D' to bear on the frames B and thus angularly move the same on the shaft as the latter is moved and during this movement the bolts D⁴ are maintained in extended positions due to the rods D² being held outwardly by the arms D'. Upon the frames reaching the inoperative position, the outer end of each bolt D⁴ pushes against a spring catch D⁷, see Fig. 2, and passes beyond it whereupon the spring catch moves to its normal position and forms a support on which the end of the bolt D⁴ rests to maintain the frame in the raised and inoperative position. When it is desired to lower the frames to the landing or operative position, the transverse shaft is angularly moved in the reverse direction, thereby causing the arms D' and the rods D² to be moved in the reverse direction so that the outer end of each bolt is moved inwardly out of the path of the spring catch D⁷; by continuing the angular movement of the shaft D the frames B are positively moved through the medium of the arms D' and the rods D² to the operative or landing position during which movement each spring D⁵ is compressed between the projection D³ and the shoulder D⁶ on the bolt D⁴ which slides along the quadrant until it reaches the notch E' into which it is moved by the spring D⁵. In the lower end of each quadrant a second or safety notch may be formed so that in the event of the frames not reaching the lowest or extreme position, the bolts D⁴ may engage with the safety notches. The wheels may be housed or covered when in the inoperative position which may be above the water line, and the angular movement may be more or less than 90°.

The means for transmitting rotational motion to the transverse shaft may comprise tension wires, chains, gears, levers and links, or the like and in order to render this movement more easy, the unbalanced moment of the rectangular frames, wheels, etc., may be compensated or partly compensated by springs or rubber cords suitably attached to the frames or to levers or quadrants on the transverse shaft, the points of attachment or the shape of the quadrants being so arranged that the compensating moment is approximately equal to the moment of the frames, wheels, etc., throughout its motion.

In the modifications shown in Figs. 5 and 6 the frames carrying the landing wheels are similar to those described in the foregoing example and similar reference letters are used to denote corresponding parts. In this example the sides of the hull are inclined outwardly toward the lower part or keel and the frames carrying the landing wheels lie parallel with the inclined sides of the hull. The upper part B' of each frame is pivoted on a pin forming part of a bracket B³ secured to the side of the hull. The transverse operating shaft D is connected at its ends to short spindles G by means of universal joints G', which spindles extend at right angles through the hull sides in suitable bearings co-axially with the pivots B³ on which the frames B are angularly movable. The outer end of each short spindle is provided with a worm G² which engages with a worm wheel G³ secured to the upper end of a rod G⁴ rotatably supported in bearings on the frame B and projecting at its lower end into a socket formed on the part B². The lower end of the rod G⁴ carries a toothed wheel G⁵, the teeth of which are in the form of rounded pegs which are adapted to engage with holes E² in the quadrant E secured to the side of the hull. The transverse operating shaft D may be rotated by chain and sprocket gearing which is actuated by the pilot by means of a rotary hand wheel which rotates a large sprocket wheel connected by a chain to a small sprocket wheel G⁶ on one of the spindles G. The rotation of this sprocket wheel G⁶ effects the rotary movement of the shaft and the other spindle G so that the worms G² and worm wheels G³ at the sides of the hull are operated simultaneously for enabling the rods G⁴ and the toothed wheels G⁵ thereon to rotate together so that the toothed wheels will travel along the quadrants by engaging with the holes E² formed therein thereby angularly moving the two frames B at the same time. During the angular movement of the frames each worm wheel is partially revolved around the axis of the worm in mesh with the latter and owing to the worm gearing the frames are held in any angular position to which they may be adjusted. The quadrant E may be connected to the bracket portion B³ by metal strips E³ which may be secured to the sides of the hull, see Fig. 6.

At the lower part of the hull an adjustable tie rod H extends between the two sides at points adjacent to the lower parts of the quadrants. In both the foregoing examples the shock absorbers F may be inclosed in stream line casings as shown for example at F³ in Figs. 5 and 6.

What we claim and desire to secure by Letters Patent of the United States is:—

1. In an aircraft, the combination with the hull, of angularly movable wheel carrying frames, a transverse shaft about the axis of which said frames are adapted to swing, locking means for holding said frames in their operative and inoperative positions, and means whereby the actuation of said transverse shaft first releases said locking means and then swings the frames about the axis of said shaft.

2. In an aircraft the combination with the hull, of angularly movable wheel carrying frames pivotally associated with the hull, means for swinging said frames to operative and inoperative positions, locking means for holding the frames in the operative and inoperative positions, said first named means when actuated to swing the frames serving to first release said locking means and then swing the frames.

3. In an aircraft, the combination with the hull, of a transverse shaft, wheel carrying frames mounted to swing about the axis of said shaft, means whereby the actuation of said shaft swings said frames, means for locking the frames in operative and inoperative positions, and means whereby the actuation of said shaft in one direction releases the locking means that holds the frames in their operative position, and means whereby the actuation of said shaft in the opposite direction renders ineffective the means for holding the frames in their inoperative position.

4. In an aircraft, the combination with the hull, of a transverse operating shaft, angularly movable wheel carrying frames pivoted on the ends of said shaft, quadrants with which the lower ends of the wheel carrying frames engage, locking pins for locking the lower ends of the frames to said quadrants, and means whereby the actuation of said shaft first releases said locking pins and then swings the wheel carrying frames.

5. In an aircraft, the combination with the hull, of angularly movable wheel carrying frames, quadrants with which the lower ends of the frames engage, operating means for swinging said frames to operative and inoperative positions, said operating means permitting the frames to be held rigidly in operative and inoperative positions, but serving when actuated to release the frames from their operative and inoperative positions.

6. In an aircraft, the combination with the hull, of angularly movable wheel carrying frames pivotally associated with the hull, locking means for locking said frames in operative and inoperative positions, actuating means for angularly moving said frames and means whereby the locking means is automatically released by the operation of said actuating means.

In testimony whereof we affix our signatures.

REGINALD KIRSHAW PIERSON.
THOMAS SMITH DUNCAN.